United States Patent Office 3,453,359
Patented July 1, 1969

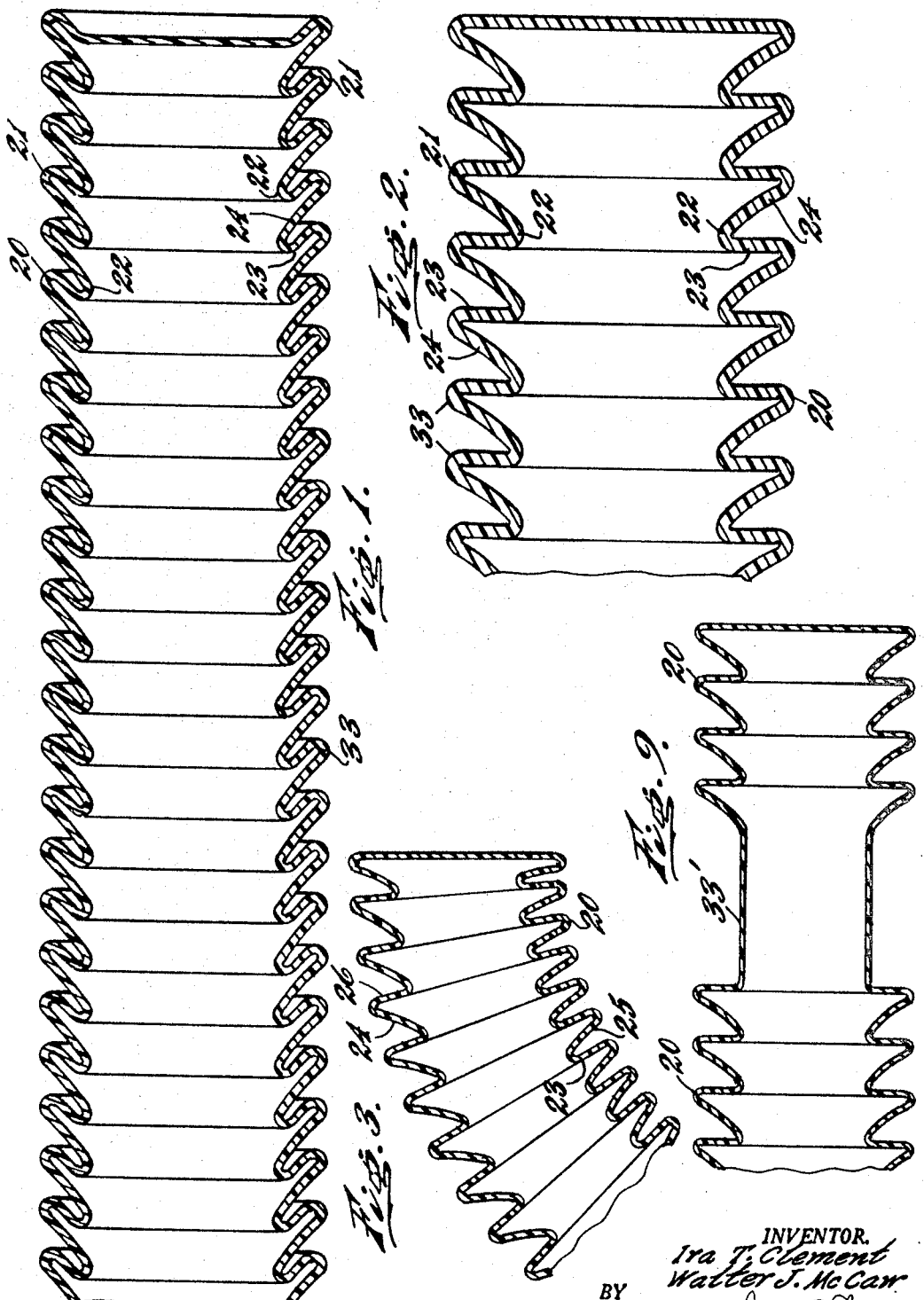

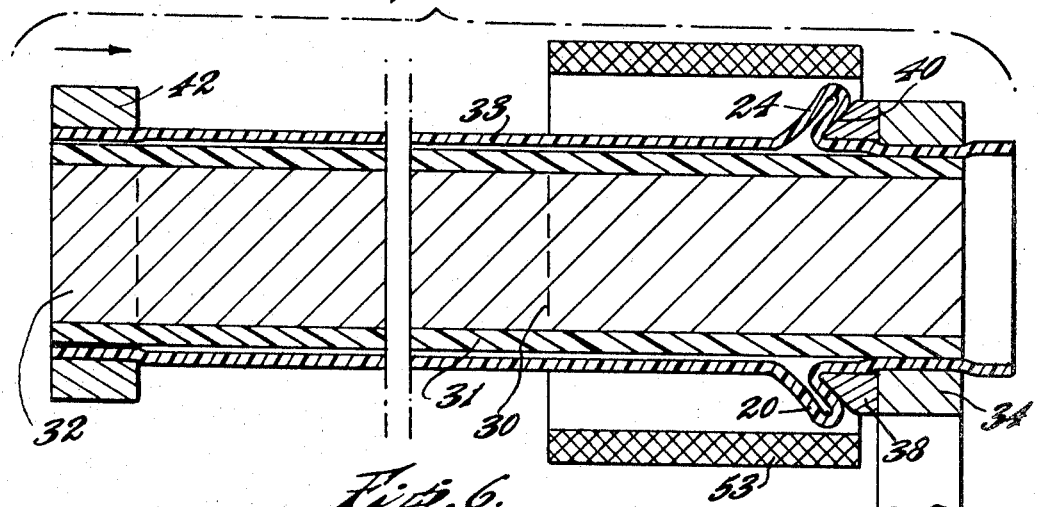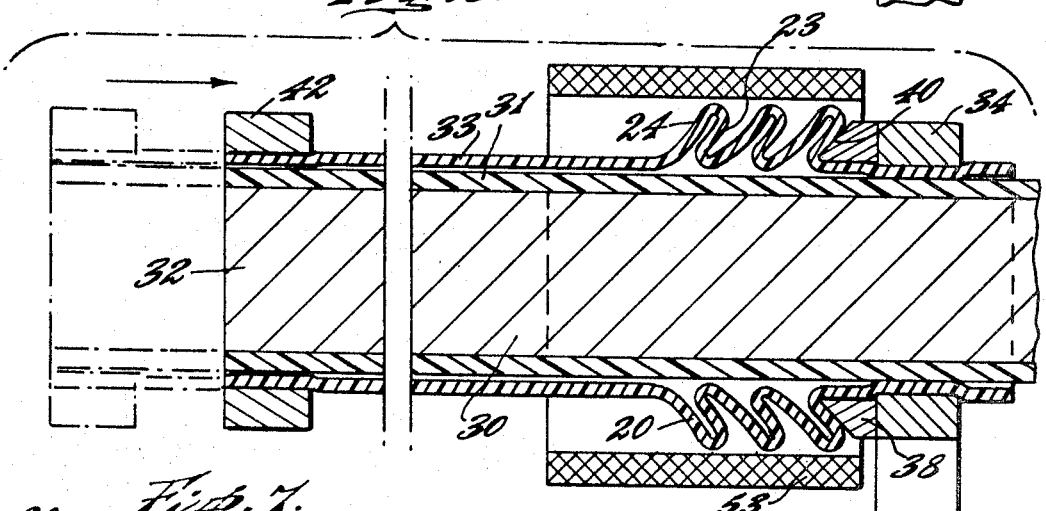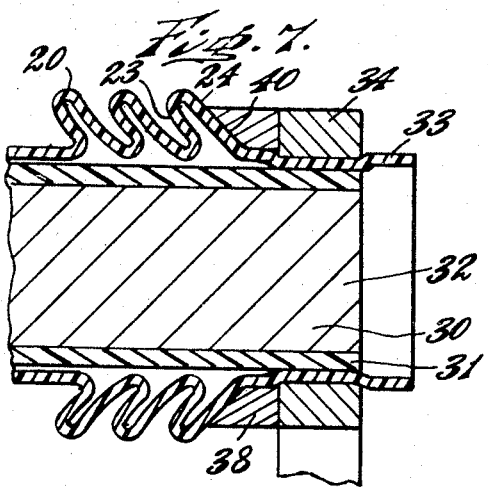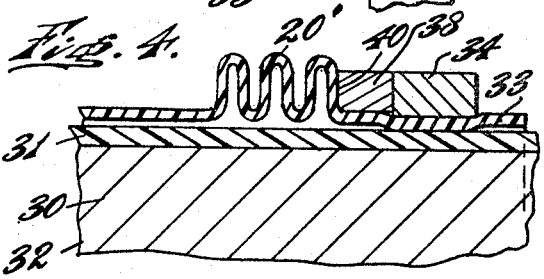

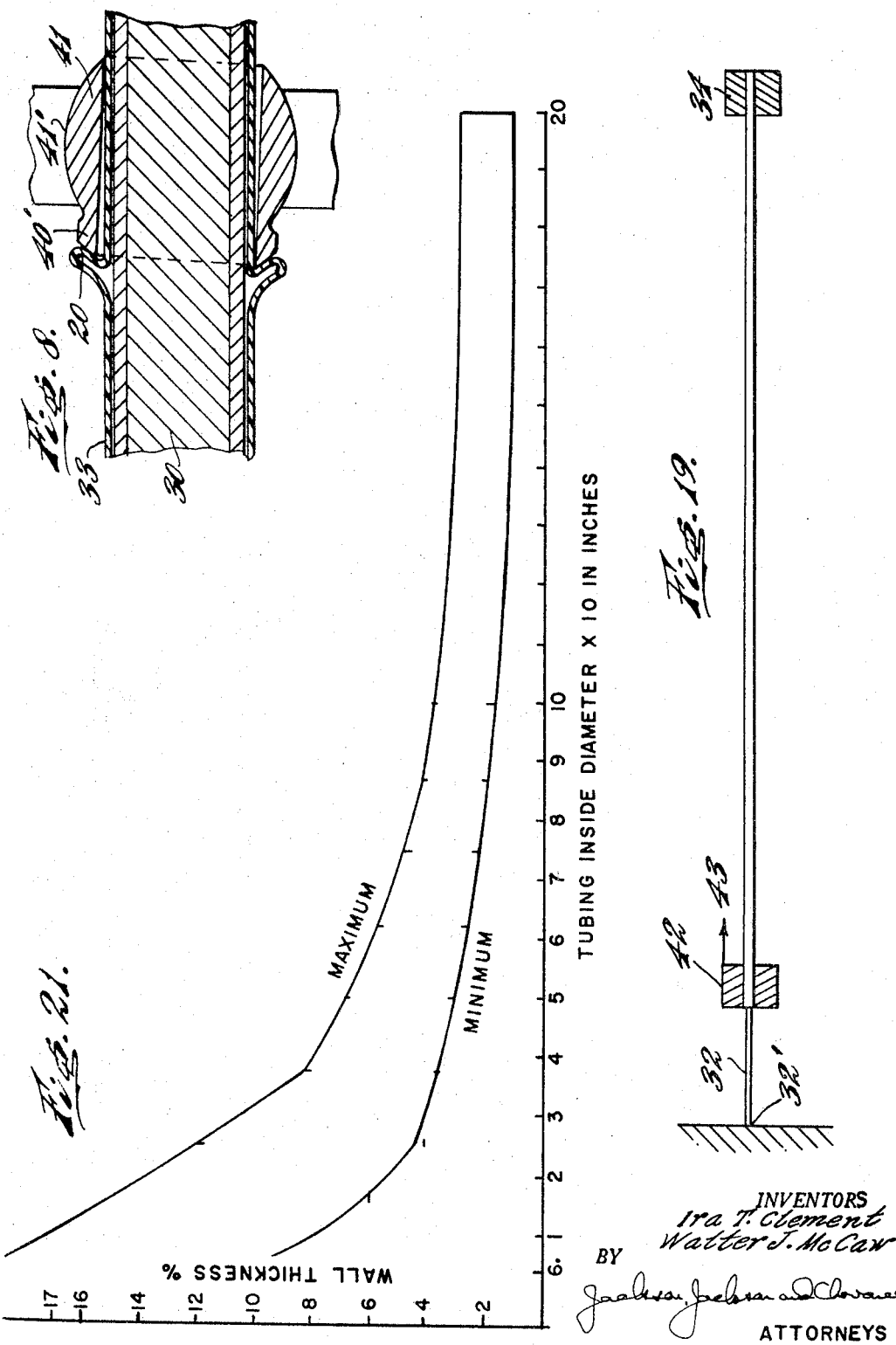

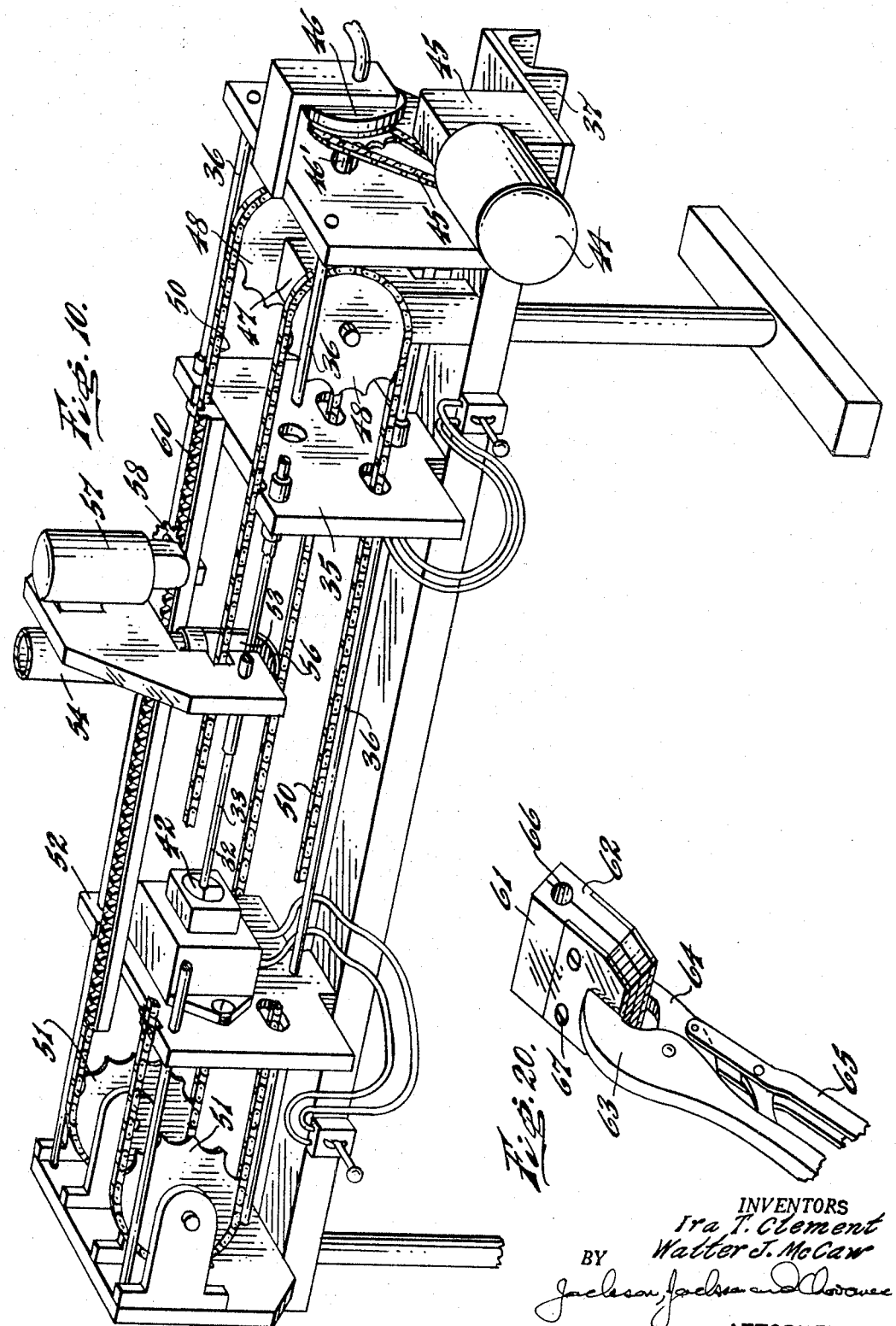

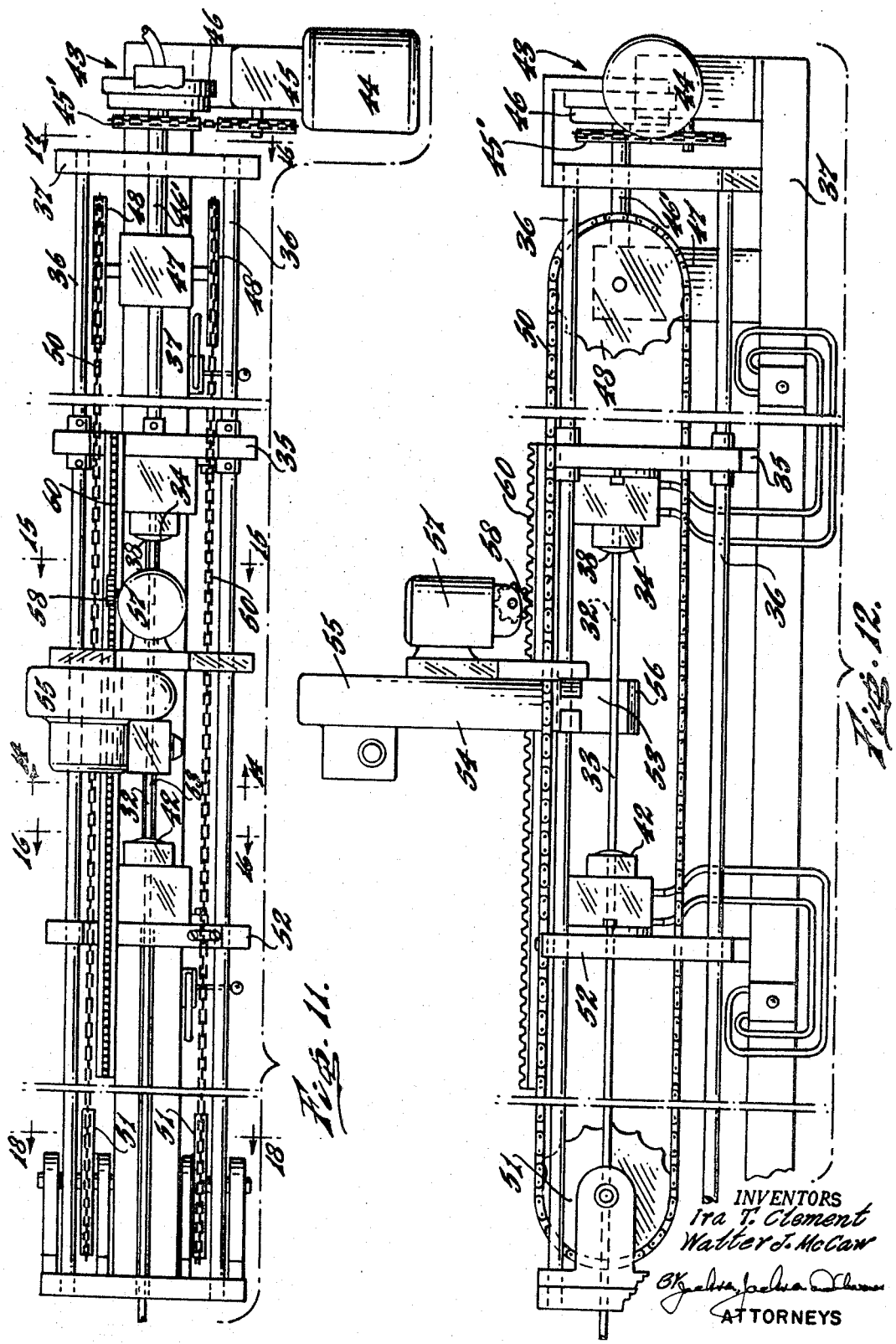

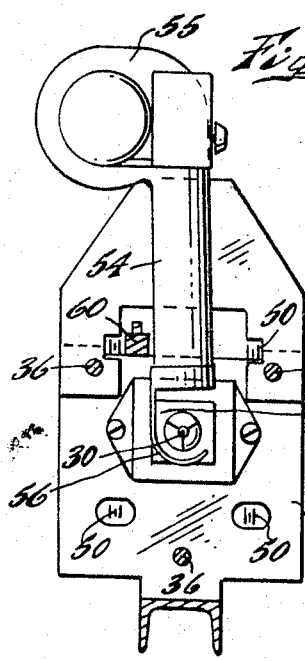
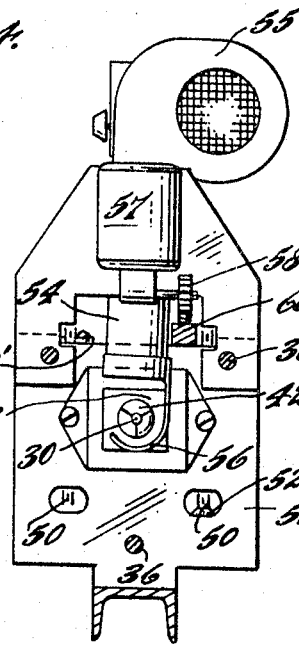
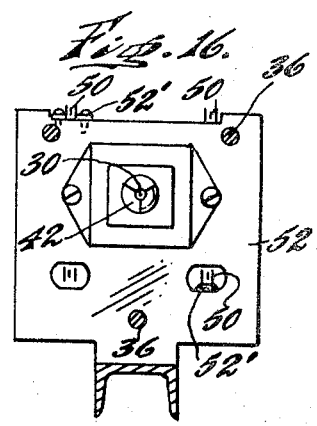
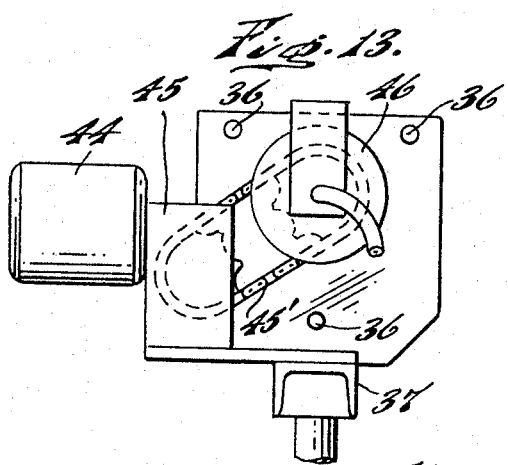
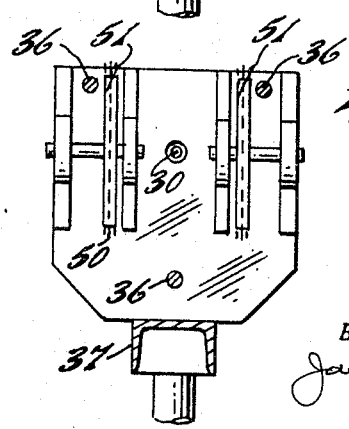

3,453,359
PROCESS FOR MAKING CORRUGATED TUBING
Ira T. Clement, Glen Mills, and Walter J. McCaw, Philadelphia, Pa., assignors to Pennsylvania Fluorocarbon Company, Inc., Clifton Heights, Pa., a corporation of Pennsylvania
Original application Sept. 12, 1966, Ser. No. 578,836. Divided and this application Sept. 6, 1968, Ser. No. 757,843
Int. Cl. B29c 17/02; B29g 5/00
U.S. Cl. 264—322          12 Claims

ABSTRACT OF THE DISCLOSURE

The invention is concerned with a process for the production of corrugated tubing which can be bent on a short radius to any desired shape and will retain this shape with or without substantial springback. The corrugations preferably extend around the tube and have side walls of unequal length. In close packed position the side walls are inclined to the axis at an acute angle producing a contour called cross-cut saw toothing or oil canning which will permit one corrugation to fold in under an adjoining corrugation in making a close bend. In the preferred process a straight plastic tube is threaded on a mandrel smaller than the inside diameter of the tube by a proper clearance, the forward end of the tube is anchored, an abutment extends generally outwardly from the tube at the forward end and preferably has a concave or convex abutting wall looking rearwardly toward the tube, the tube is pushed from the rear so as to collapse it outwardly in a series of corrugations, the first of which conforms to the adjoining face of the abutment and the succeeding ones of which conform to the previous corrugations. In the preferred embodiment the plastic is heated adjoining the forward end to about the heat distortion temperature of the plastic. The corrugations are preferably annular but helical corrugations can be made by allowing the abutment to form a helix angle to the axis by providing a wobble pivot for the abutment. The tube with the corrugations still close-packed is ordinarily heat set while the tube is still on the mandrel.

Disclosure of invention

The present application is a division of our application Ser. No. 578,836, filed Sept. 12, 1966 for Corrugated Tubing Process and Mechanism.

The present invention relates to processes of making corrugated tubing.

When a tube is referred to herein it is intended to describe a hollow object which can be a container housing, sleeve or tube.

A purpose of the invention is to produce a corrugated plastic tube which will make close bends without kinking, and will hold its bent form without objectionable springback.

A further purpose is to make corrugated plastic tubing in which the wall thickness will be substantially uniform throughout.

A further purpose is to produce corrugated plastic tubing where the inside diameter of the corrugations is at least as large as the inside diameter of the straight tubing.

A further purpose is to produce corrugated plastic tubing whose corrugations extend outwardly and have side walls of unequal length which in close-packed form are inclined to the axis and which can fold in under adjoining corrugations without kinking when bends on small radii are made.

A further purpose is to provide a clearance between the outside diameter of the smooth mandrel and the inside diameter of the tubing which will be not in excess of 0.030 inch down to 0.000 inch, preferably 0.005 to 0.030 inch and most desirably about 0.010 inch, so as to desirably prevent binding and to avoid the tendency to form nonuniform corrugations.

A further purpose is to form corrugations without confining or restraining the tube from the outside, by gripping the tube at the forward end, disposing an annular abutment at the forward end and extending radially outwardly of the tube and preferably having an inclined annular surface facing the tube, either concave or convex, to preferably heat the tube at the forward end to a temperature of about the heat distortion temperature for the plastic, and to push the tube forward from the rear and so as to collapse it outwardly in a series of corrugations.

A further purpose is to provide an angularly disposed abutment adjoining the axis so that the corrugations will be helical.

A further purpose is to form annular corrugations by the technique above described.

A further purpose is to provide plastic tubing which bears a relation between inside diameter and wall thickness as shown in the following table, such tubing being especially suitable for corrugation by the procedure of the present invention.

| Tubing inside diameter in inches | Approx. permissible range of wall thickness in percent of inside diameter |
|---|---|
| 0.060 | 10–20 |
| 0.250 | 4–12 |
| 0.375 | 4–8 |
| 0.500 | 3.5–7 |
| 0.625 | 2.9–5.6 |
| 0.750 | 2.3–4.6 |
| 0.875 | 2.1–4.2 |
| 1.000 | 2–4 |
| 2.000 and larger | 1–2.5 |

Further purposes appear in the specification and in the claims.

In the drawings we have chosen to illustrate several only of the numerous embodiments in which the invention may appear, selecting the forms shown from the standpoints of convenience in illustration, satisfactory operation and clear demonstration of the principles involved.

FIGURE 1 is an axial section of corrugated tubing according to the invention in close packed position, illustrating cross-cut sawtooth corrugations.

FIGURE 2 is an axial section of the tubing of FIGURE 1 elongated but still straight.

FIGURE 3 is a view similar to FIGURE 2 showing the tubing of FIGURE 2 bent into a bend on a small radius.

FIGURE 4 is a diagrammatic axial section showing the formation of symmetrical ring-like corrugations by the method of the invention, using an abutment which has a face extending at right angles to the axis.

FIGURE 5 is a diagrammatic axial section showing the formation of the first corrugation after the manner of FIGURES 1 to 3 against an abutment having a convex face.

FIGURE 6 is a view similar to FIGURE 5 showing the formation of successive ring-like corrugations having a cross-cut sawtooth shape. FIGURE 6 represents a further advance of the operation shown in FIGURE 5.

FIGURE 7 is a diagrammatic axial section showing the formation of ring-like corrugations having a cross-cut sawtooth form, using a concave abutment face.

FIGURE 8 is a diagrammatic axial section showing the formation of helical corrugations using an abutment which is disposed according to a helix angle and is mounted on a wobble pivot whose center is generally adjacent the axis. While these corrugations are of crosscut sawtooth shape because the face of the abutment is convex, it will be understood that the corrugations can be symmetrical if the abutment extends out generally transverse to the axis.

FIGURE 9 is an axial section showing a tube according to the invention which has areas of corrugations and an intervening straight area.

FIGURE 10 is a perspective of mechanism useful in carrying out the operation of the invention.

FIGURE 11 is a top plan view partially broken to shorten it, showing mechanism for making the tubing of the invention.

FIGURE 12 is a side elevation, partially broken, of the mechanism shown in FIGURE 11.

FIGURE 13 is a right end elevation of FIGURE 11.

FIGURE 14 is a section on the line 14—14 of FIGURE 11, showing particularly the heater and heating chamber and the mounting therefor.

FIGURE 15 is a section on the line 15—15 of FIGURE 11 chiefly showing the heater chamber drvie.

FIGURE 16 is a section on the line 16—16 of FIGURE 11 showing the crosshead for mounting the rear collet and also showing the rear collet.

FIGURE 17 is a section on the line 17—17 of FIGURE 11 showing the forward end of the frame.

FIGURE 18 is a section on the line 18—18 of FIGURE 11 showing the rearward end of the frame and the idler pulleys and the journals therefor.

FIGURE 19 is a diagrammatic axial section showing a modification for making very small tubing in which the mandrel is loaded in tension by being anchored at a rearward point.

FIGURE 20 is a perspective of a clamp which is useful to prevent the formation of corrugations where a tube is intended to have a straight portion separated by a corrugated portion.

FIGURE 21 is a diagram plotting maximum and minimum wall thickness in percentage of inside diameter as ordinates against tubing inside diameter times 10 in inches as abscissae.

Considerable use has been made in the art of corrugated tubing formed of plastics, a well-known example being gas mask tubing. This tubing has been made by molding separate halves and then joining them together by expanding the tubing into a female die, or by threading the tubing on a mandrel, restraining portions of the tubing by a die against outward movement and collapsing intervening portions to form exterior corrugations, as best seen in Harding U.S. Patent No. 2,347,101, granted Apr. 18, 1944, for Method of Making Corrugated Tubes, and in Curtiss et al. U.S. Patent 2,347,086, granted Apr. 18, 1944, for Tube Corrugating Machine.

The present invention is concerned with the making of a superior corrugated plastic tubing, and also making it in a simpler manner.

Plastics

Any one of a wide variety of flexible plastics can be formed in producing the tubing of the invention but it is important that the tubing have adequate elongation, and for good results we believe that the ultimate elongation of the plastic at room temperature in the initial form being used for making the corrugated tubing should exceed 100%. If the ultimate elongation is less than 100% the corrugated tubing in any case is not flexible.

The preferred plastics for making the tubing of the invention are the fluorinated hydrocarbons, such as polytetrafluoroethylene (Teflon TFE), and the copolymer of tetrafluoroethylene and 5 to 35% by weight of hexafluoropropylene (Teflon FEP).

The process of the invention does not work with polytrifluorochloroethylene (Kel-F).

Other suitable plastics may be used and tubing according to the invention has been made of polyethylene, flexible polyvinylchloride, and irradiated plastic produced from a mixture of polyethylene and polypropylene. Other suitable plastics may be employed.

The process of the invention does not work with nylon, with polypropylene, with polyurethane rubber or with vulcanized neoprene rubber.

Product

One of the great advantages of the tubing of the invention, unlike corrugated tubing generally, is that it can be formed in intricate bends and curves even on very short radii, without any tendency to kink or obstruct internal flow, and the tubing in the preferred embodiment holds the new shape without appreciable tendency to spring back. This is particularly characteristic of the tubing of the invention produced from polytetrafluoroethylene or the copolymer of tetrafluoroethylene and 5 to 35% by weight of hexafluoropropylene, with the cross-cut saw tooth formation of corrugations, after heat setting.

Thus in FIGURE 1 this tubing as initially formed and heat set has a series of corrugations 20, which have close U bends 21 at the outside and close U bends 22 at the inside, the sides of the corrugations being generally parallel and including a short side 23 and a long side 24.

When the tubing is elongated to the contour shown in FIGUER 2, it will be seen that the short side 23 of the corrugation achieves a condition in which it extends substantially straight out from the axis, the long side 24 of the corrugation is inclined, the inside bend 22 is still sharp, but the outside bend 21 has become slightly more gradual.

If now the tubing is bent on a small radius for example of the order of its own diameter or smaller, as suggested by the more gradual bend shown in FIGURE 3, the tendency is for the short sides 23 of the corrugations at the inside to move in under adjoining corrugations as shown at 25, while the short sides 23 of the corrugations at the outside tend to achieve an angle opposing the long sides 24 of the corrugations as shown at 26. This behavior is quite different from that which is commonly encountered with sinusoidal corrugations, which are not freely able to move in under adjoining corrugations since both corrugations are symmetrical.

It is because of this peculiar property of the cross-cut sawtooth corrugations that the tubing of the invention is especially able to take very close bends, without kinking, and hold these bends without appreciable springback.

While the tubing of the invention can be made with equal-sided corrugations 20' by using an abutment which extends straight out at right angles to the axis, as shown in FIGURE 4 this is generally not preferred and considerable advantage is found in corrugations having the cross-cut saw tooth shape.

A further great advantage of the corrugated plastic tubing of the invention is that the wall is not appreciably thinned at any point in forming the corrugations, and, therefore, no location of weakness exists. This characteristic of the tubing has led to designating the process as flow forming.

Corrugated tubing according to the invention having the cross-cut saw tooth configuration of individual annular corrugations has been bent thousands of cycles before failure in a mechanical test rig and similar manual tests have been carried out. The failure when it did occur was generally at the top of the corrugation where the greatest energy appears to be expended.

In the corrugated tubing according to the invention, whether it is straight or bent, the diameter is not reduced internally beyond the initial internal diameter of the tube, so that there is no tendency to retard flow even in an integral tube, a portion of which is straight at 33' and another portion of which is corrugated as shown in FIGURE 9.

Corrugated tubing according to the invention can be produced in a wide range of internal diameters, as large as 10 inchs or larger and as small as 1/16 inch. Extensive demand appears to exist for corrugated tubing of the invention in size ranges between 1/8 inch and 1 inch in 1/8 inch increments.

The permissible approximate relation of the wall thickness to the internal diameter in corrugated tubing according to the invention is as follows:

| Tubing inside diameter in inches | Approx. range of wall thickness in inches | Approx. range of wall thickness in percent of inside diam. | Preferred wall thickness in inches |
|---|---|---|---|
| 0.060 | 0.006–0.012 | 10–20 | 0.005 |
| 0.250 | 0.010–0.030 | 4–12 | 0.015 |
| 0.375 | 0.015–0.030 | 4–8 | 0.020 |
| 0.500 | 0.018–0.035 | 3.5–7 | 0.028 |
| 0.625 | 0.018–0.035 | 2.9–5.6 | 0.020 |
| 0.750 | 0.020–0.040 | 2.3–4.6 | 0.020 |
| 0.875 | 0.020–0.040 | 2.1–4.2 | 0.030 |
| 1.000 | 0.020–0.040 | 2–4 | 0.030 |
| 2.000 and larger | 0.020–0.050 | 1–2.5 | 0.035 |

FIGURE 21 is a crude chart showing maximum and minimum wall thickness in percent of inside diameter as ordinates plotted against tubing inside diameter times 10 in inches as abscissae.

When the corrugated tubing of the invention is formed, the corrugations are close packed, but these corrugations can be pulled out or separated by applying longitudinal pull on the tube as desired. Usually the close-packed corrugated form is made from a straight plastic tube of two and one-half to three times the final length. The ability to stretch the corrugations longitudinally is helpful in some cases in applying tube to fittings in narrow spaces.

For best results in holding bends without springback, the relation of the inside diameter to the wall thickness should be as follows:

| Tubing inside diameter in inches | Minimum wall thickness in inches for holding position in best manner without springback |
|---|---|
| 1/4 | 0.015 |
| 3/8 | 0.020 |
| 1/2 | 0.020 |
| 5/8 | 0.025 |
| 3/4 | 0.030 |
| 7/8 | 0.030 |
| 1 | 0.035 |

Tests show that the thicker the wall, the smaller the number of corrugations which can be formed in a given length. For Teflon FEP the following data were obtained:

| Inside diameter in inches | Wall thickness in inches | Corrugations per foot |
|---|---|---|
| 1/4 | 0.015 | 79 |
| 3/8 | 0.020 | 76 |
| 1/2 | 0.020 | 54 |
| 3/4 | 0.020 | 40 |
| 3/4 | 0.030 | 35 |
| 3/4 | 0.040 | 30 |
| 1 | 0.030 | 25 |

*Process and mechanism*

In making the tubing of the invention, a suitable straight plastic tubing will be used as a starting material. While the tubing need not be circular in cross section, it will ordinarily be such, and for simplicity the discussion will be directed to tubing of circular cross section.

The relation of wall thickness to diameter of tubing will be as above set forth.

A smooth mandrel is placed inside the tubing, FIGURE 5, suitably by sliding the tubing on the mandrel. The mandrel must be at least as small as the tubing interior. While clearance is not necessary and can be 0.000 inch, it is very desirable, but the mandrel diameter should not be more than 0.030 inch less than the inside diameter of the tubing. Preferably the clearance should be between 0.005 and 0.030 inch and most desirably it should be about 0.010 inch. If the clearance is too small there is a tendency to bind, which interferes with the formation of corrugations, and if the clearance is greater than 0.030 inch the corrugations form in a haphazard and non-repetitive manner which is objectionable.

It is decidedly desirable to use a slippery surface on the mandrel. This is best obtained by using a mandrel having a metallic core 30 and a coating or sleeve 31 of polytetrafluoroethylene or Teflon FEP. It is also good practice to use a lubricant between the mandrel and the tube. While lubricants of the character of finely divided talc may be used, it is preferable to use a liquid lubricant such as an oil, preferably water soluble polyalkylene glycol (Union Carbide Ucon).

Once the mandrel 32 is slid through the plastic tube 33, the tube should be anchored at its forward end in the direction of pushing. This is preferably done by gripping the tube against the mandrel by collet 34 which holds the tube and mandrel firmly together until the collet is released, the collet being held by a crosshead 35 fixed on longitudinal guides 36 held by a frame 37, FIGURES 11 and 12.

An annular abutment 38 is provided extending generally radially outside the tube as a means of defining the first corrugation. The abutment has a face 40 directed toward the rear of the tube, which for many aspects of the invention should be inclined to the axis suitably at an angle between about 30° and 60° so as to form a convex abutment as in FIGURES 5 and 6, or a concave abutment as in FIGURE 7. Either of these formations creates the crosscut saw tooth shape of corrugations as previously described which are so desirable in the present invention, and assures the formation of corrugations which are annular rings rather than endless helices if the abutment is symmetrical to the axis. Less desirably and if corrugations which are symmetrical or approaching sinusoidal are desired, the abutment face 40 can be transverse to the axis as in FIGURE 4.

If the abutment is free to cant its angle to the axis corresponding to a helix angle, it will produce a first corrugation and successive corrugations will form thereon in the shape of a helix. In FIGURE 8 the abutment 40' is shown mounted on a wobble pivot or ball 41 in a wobble pivot bearing 41', the center of the ball being on the axis. The ball is desirably hollowed to permit the tubing and mandrel to extend therethrough to be engaged by the forward collet. The abutment 40' may as shown be concave or convex so as to form corrugations of crosscut saw tooth shape as shown or it can be at right angles to the axis when symmetrically placed so as to produce uniform corrugations.

When an abutment is mounted on a wobble pivot as shown, as the first corrugation begins to form the abutment by itself wobbles about the wobble pivot and creates the beginning of a helix which continues as successive corrugations are formed without further change in the apparatus or process.

Any convenient mechanism may be used to push or pull on the rear of the tube in an axial direction. It is not necessary and there is no advantage in the present invention in employing an intermittent push or pull, the pushing or pulling being preferably continuous. For this purpose it has been found convenient to grip the tube lightly near the rear by a collet 42 which does not grip against the mandrel. The collet 42 is urged forward in the axial direction by chains 50 from suitable pulling mechanism 43. A convenient pushing or pulling mechanism has been found to be a motor 44 turning a speed reducer 45 which through a chain drive 45' drives a clutch 46 which slips beyond a predetermined torque level. The clutch 46 through a shaft 46' drives a gear box 47 which oppositely drives sprockets 48, carrying chains 50 meshing at the opposite end of the machine in suitably journalled idler sprockets 51. Chains 50 at respectively upper and lower stretches are anchored at 52' to crosshead 52 sliding on guides 36. Crosshead 52 carries collet 42. Thus the pushing or pulling mechanism always maintains a predetermined axial force on the rear collet 42. Merely as a gage of this, it has been found that in corrugating ¾ inch ID tubing having a wall thickness of 0.030 inch made of the copolymer of tetrafluoroethylene and 5 to 35% by weight of hexafluoropropylene (Teflon FEP) the axial force should be about 70 pounds. In tubing made from polytetrafluoroethylene having ¾ inch inside diameter and a wall thickness of 0.040 inch, the axial force will suitably be around 120 pounds.

In FIGURE 19 we show a device in which a very small tube is being corrugated, using a very small mandrel 32 anchored at the rear at 32' so that the axial force from the pushing or pulling mechanism 43 loads the mandrel in tension and it cannot buckle.

The collapsing can be done cold, but it is much better to heat the tubing to about its heat distortion temperature. Suitable heat distortion temperatures for various materials are as follows:

| | |
|---|---|
| Teflon FEP | about 250° F. |
| Teflon TFE | about 250° F. |
| Polyethylene | about 120° F. |

The heat distortion temperature is determined according to ASTM specification D648–51 (66 p.s.i.).

Because of the fact that many of the plastics should not be exposed to high temperatures for excessive lengths of time, it is preferable to heat the forward end of the tubing locally rather than to heat the entire length of the tube. An air heater of the character of a hair drier, heat gun, or radiant heater may be used as desired and if necessary to obtain uniformity of heating, the tubing can be rotated.

In FIGURES 14 and 15 a heating chamber 53 is shown surrounding the forward end of the tube in spaced relation, receiving hot air blown in at 54 from a hot air heater 55, and deflecting it by a circumferential baffle 56 around the tube at the point where the corrugations are to be formed. The heating chamber moves backward under the action of a reversible motor 57 mounted on the heater 55, having a built-in speed reducer and driving a gear 58 meshing with a longitudinal rack 60 suitably mounted from the cross-heads. The heater slides on the longitudinal guides 36.

After formation of the corrugations along the tube in close-packed relation, it is decidedly desirable to heat set the corrugations in the tube if the plastic is heat settable. This involves heating preferably by removing the mandrel and the tube to a heating means or a heating medium which can be a hot oil bath, a salt bath, a liquid heating means or an air oven.

Suitable heat setting temperatures for various materials, assuming a time of at least 10 minutes, are as follows:

| | ° F. |
|---|---|
| Teflon FEP | 300–400 |
| Teflon TFE | 450–500 |
| Polyethylene | 170–190 |
| Flexible polyvinylchloride | 190–220 |
| Irradiated mixture of polyethylene and polypropylene | 225–250 |

The corrugations can be formed by hand by simply pushing the tubing in the direction to form the next corrugation.

The sizes of the corrugations are controlled by such factors as the inside diameter of the tubing, the wall thickness, the nature of the plastic, the temperature, and the longitudinal pull.

In operation, assuming that the tubing has slid on a proper mandrel of proper size for the tubing as previously explained, and that the collets have been properly engaged and the forward abutment properly positioned, and assuming that proper heating of the forward portion of the tube has been used where heating is to be employed, the shape of the first corrugation will be particularly influenced by the face of the abutment looking out toward the rear of the tubing and the presence or absence of concentricity of this abutting surface with respect to the axis of the tubing. Assuming that the abutting surface is either convex or concave and concentric, the first corrugation will be annular and of crosscut saw tooth formation as already explained. The next and succeeding corrugations will each be annular and will conform to the shape of the preceding corrugation.

In the preferred embodiment of the device, the heating device moves rearwardly as the corrugations form so that there is always adequately softened plastic ready to form the next corrugations.

If the rearwardly abutting face is transverse to the axis, then symmetrical or approaching sinusoidal corrugations will be formed as shown in FIGURE 4.

The tubing, unlike processes in the prior art, is externally unsupported or unconfined from the forward abutment to the rear collet.

If the rearward face of the abutment is disposed to the axis at a pitch angle for forming a helical corrugation as by mounting the abutment on a wobble pivot as shown in FIGURE 8 the corrugations will be endlessly helical instead of annular. This form is in many cases less desirable, however, as it does not readily bend and retain bends.

After completion of the corrugations along the length of the tube or such portion of the length of the tube as is to be corrugated, the tubing and the mandrel are removed by releasing the collets and placed in a heat setting oven or the like.

FIGURE 20 illustrates a clamp to prevent the formation of corrugations on straight tubing portions 33' shown in FIGURE 9. Opposed jaws 61 and 62 are mounted on respective jaws 63 and 64 of a pair of lever jaw clamping pliers 65. Each of the jaws 61 and 62 has a cylindrical portion 66 and when the jaws 61 and 62 are together they closely engage the outside of the tubing 33 and prevent it from forming corrugations at the particular location. The jaws 61 and 62 are exchangeable by mounting them on screws 67 from the respective jaws of the pliers.

Uses of corrugated tubing

One of the great virtues of the corrugated tubing according to the invention, especially when it is of crosscut sawtooth formation and made of a heat set material, is that it will take bends readily because of its high flexibility over a very short radius without kinking or reducing the internal diameter which would impede flow. This is very desirable in chemical apparatus both in the laboratory and in the plant where it is undesirable to have a tube pulling on fittings due to springback.

This is effective for heat transfer applications as in heating, air conditioning and cooling systems. The fact that the surface of the tubing is greatly increased with respect to the straight tubing from which the corrugated tubing was made further promotes heat transfer. Also, the tubing is effective to promote turbulent flow, and this helps both in heat transfer and in mixing of liquids or gases flowing through the tubing. One evidence that turbulent flow is created is that a whistle individual to the particular tubing size and configuration can be obtained by blowing through tubes according to the invention.

Thus the tubing of the invention can be sold in straight corrugated lengths or in coils of corrugated tubing or in prebent form.

Since much of the tubing according to the invention can be transparent, as for example in the case of the fluorinated hydrocarbons, polyvinylchloride and polyethylene, it can be used to transport fluids to instruments and filling apparatus while making it possible to observe flow or foreign matter in the tubing.

The tubing of the invention can be used to undergo repeated shortening and lengthening especially in the cross-cut sawtooth form and this is useful where the tubing length must change as in connecting to filling mechanism.

The tubing of the invention is sensitive to differential pressure as far as its stable length is concerned and when subjected to reduced pressure inside, has a tendency to shorten which can be measured or caused to move an attachment device similar to a diaphragm.

Corrugated tubing of the invention, especially of the cross-cut saw tooth type, is very effective as a highly flexible vacuum tubing since it resists collapsing inwardly. Usual vacuum tubing is often not very flexible.

The tubing of the invention has a number of important electrical applications. It can be used as a cable or harness dielectric for conductors and advantages can be taken of the very fine dielectric properties of the plastic of which it is made and also the slipperiness in the case of the fluorinated hydrocarbons. It is thus applicable for wiring and cable harnesses for vehicles and the like.

One great virtue is that conductors can be inserted readily when the corrugations are close packed, and then the corrugated tubing can be extended to the proper length. Also the corrugated tubing does not stiffen the cable. The corrugated tubing can also be used for conductor insulation generally.

Forming no part specifically of the present invention, it has been suggested that the tube of the invention can make effective patterns for bending pipe and tubing, bending the tubing to the desired shape and then filling it with plastic foam such as polyurethane or polystyrene to make it hold the bent shape indefinitely.

A wide variety of fittings and attachments can be used to connect to the tubing of the invention. End portions can be left straight to facilitate connection to fittings and drawn tubing. The corrugated ends of the tubing can be gripped by clamp or crimp fittings. The end portions of the tubing can be restraightened, flared or flanged using heat. One advantage of the invention in connecting it to fixed fittings, is that it can be shortened or lengthened within a considerable range by simply pushing or pulling lengthwise.

It will be evident that one unusual capability of the tubing of the invention is that by elongating it the external diameter of the corrugated portion slightly reduces, and the tubing if inserted in a proper size opening while elongated will by its natural enlargement of the corrugations as it shortens conform to and fit the opening.

In view of our invention and disclosure, variations and modifications to meet individual whim or particular need will doubtless become evident to others skilled in the art to obtain all or part of the benefits of our invention without copying the process shown.

Having now described our invention what we claim as new and desire to secure by Letters Patent is:

1. A process of making corrugated plastic tubing from plastic of class consisting of polytetrafluoroethylene, a copolymer of tetrafluoroethylene and 5 to 35% by weight of hexafluoropropylene, polyethylene, flexible polyvinylchloride, and irradiated plastic mixtures of polyethylene and polypropylene which as formed has an ultimate elongation of at least 100% at room temperature, the tubing having an inside diameter related to wall thickness as follows:

| Tubing inside diameter in inches | Approx. permissible range of wall thickness in percent of inside diameter |
| --- | --- |
| 0.060 | 10-20 |
| 0.250 | 4-12 |
| 0.375 | 4-8 |
| 0.500 | 3.5-7 |
| 0.625 | 2.9-5.6 |
| 0.750 | 2.3-4.6 |
| 0.875 | 2.1-4.2 |
| 1.000 | 2-4 |
| 2.000 and larger | 1-2.5 | which comprises providing a mandrel whose outside diameter is not less than 0.030 inch less than the inside diameter of the tubing, slipping the tubing on the mandrel, anchoring the forward end of the tubing, providing around the tubing adjacent the forward end an abutment having a face toward the rearward end of the tubing which is inclined to the axis but symmetrical around the axis, forcing the tubing longitudinally from a point near the rearward end toward the abutment and thus collapsing the tubing outwardly to form first an annular corrugation against the abutment face and then successive annular corrugations against the more forward corrugations, thus producing close-packed annular corrugations in the tube whose side walls are of unequal length.

2. A process of claim 1, in which the face of the abutment is convex.

3. A process of claim 1, in which the face of the abutment is concave.

4. A process of claim 1, which comprises heating the tubing rearward of the forward most corrugation to temperature of about the heat distortion temperature.

5. A process of claim 4, in which the plastic is a heat settable plastic, which comprises heat setting the tubing while on the mandrel and while the corrugations are close packed.

6. A process of claim 5, which comprises covering the mandrel with a plastic of the class consisting of polytetrafluoroethylene and the copolymer of tetrafluoroethylene and 5 to 35% of hexafluoropropylene.

7. A process of claim 1, in which the clearance between the mandrel and the tubing is at least 0.005 inch.

8. A process of making corrugated plastic tubing from plastic of class consisting of polytetrafluoroethylene, a copolymer of tetrafluoroethylene and 5 to 35% by weight of hexafluoropropylene, polyethylene, flexible polyvinylchloride, and irradiated plastic mixtures of polyethylene and polypropylene which as formed has an ultimate elongation of at least 100% at room temperature, the tubing having an inside diameter related to wall thickness as follows:

| Tubing inside diameter in inches | Approx. permissible range of wall thickness in percent of inside diameter |
| --- | --- |
| 0.060 | 10-20 |
| 0.250 | 4-12 |
| 0.375 | 4-8 |
| 0.500 | 3.5-7 |
| 0.625 | 2.9-5.6 |
| 0.750 | 2.3-4.6 |
| 0.875 | 2.1-4.2 |
| 1.000 | 2-4 |
| 2.000 and larger | 1-2.5 | which comprises providing a mandrel whose outside diameter is less than 0.030 inch less than the inside diameter of the tubing, slipping the tubing on the mandrel, anchoring the forward end of the tubing, positioning around the tubing adjacent the forward end an abutment having a face toward the rearward end of the tubing which is nonsymmetrical with respect to the axis and canted with respect to the axis at an angle conforming to a helix angle for a helix, said abutment being free to wobble about a pivot adjacent the axis of the tubing, and forcing the tubing longitudinally from a point near the rear end toward the abutment and thus collapsing the tubing outward to form a first helical corrugation against the abutment face and then successive helical corrugations against the more forward corrugations, thus producing close-packed helical corrugations on the tubing.

9. A process of claim 8, in which the face of the abutment is inclined to the axis also in a radial direction to form a convex or concave surface.

10. A process of claim 9, which comprises heating the tubing rearward of the forwardmost corrugation to a temperature of about the heat distortion temperature.

11. A process of claim 10, in which the plastic is a heat settable plastic, which comprises heat setting the tubing while on the mandrel and while the corrugations are close packed.

12. A process of making corrugated plastic tubing from plastic of class consisting of polytetrafluoroethylene, a copolymer of tetrafluoroethylene and 5 to 35% by weight of hexafluoropropylene, polyethylene, flexible polyvinylchloride, and irradiated plastic mixtures of polyethylene and polypropylene which as formed has an ultimate elongation of at least 100% at room temperature, and in which the tubing has a relation of inside diameter to wall thickness as follows:

| Tubing inside diameter in inches | Approx. permissible range of wall thickness in percent of inside diameter |
|---|---|
| 0.060 | 10-20 |
| 0.250 | 4-12 |
| 0.375 | 4-8 |
| 0.500 | 3.5-7 |
| 0.625 | 2.9-5.6 |
| 0.750 | 2.3-4.6 |
| 0.875 | 2.1-4.2 |
| 1.000 | 2-4 |
| 2.000 and larger | 1-2.5 | which comprises providing a mandrel whose outside diameter is less than 0.030 inch less than the inside diameter of the tubing, sliding the tubing on the mandrel, anchoring the forward end of the tubing, providing around the tubing adjacent the forward end an abutment extending outward generally from the axis to form a rearwardly directed face, the tubing rearward of the abutment to a point adjoining the rearward end being free from external restraint, heating the tubing rearwardly of the abutment to a temperature of about the heat distortion temperature, forcing the tubing longitudinally from a point near the rearward end toward the abutment face and thus collapsing the tubing outwardly to form a corrugation against the abutment, moving the point of heating rearward of the tubing as successive corrugations form and concurrently forming successive corrugations against the more forward corrugations.

References Cited

UNITED STATES PATENTS

| | | | |
|---|---|---|---|
| 2,347,101 | 4/1944 | Harding | 264—339 |
| 3,339,004 | 8/1967 | Nardon | 264—293 |
| 3,343,220 | 9/1967 | Martinek | 18—19 |
| 3,370,118 | 2/1968 | Lowe | 264—294 XR |

ROBERT F. WHITE, *Primary Examiner.*

RICHARD R. KUCIA, *Assistant Examiner.*

U.S. Cl. X.R.

264—296

PO-1050
(5/69)

UNITED STATES PATENT OFFICE
CERTIFICATE OF CORRECTION

Patent No. 3,453,359            Dated July 1, 1969

Inventor(s) Ira T. Clement and Walter J. McCaw

It is certified that error appears in the above-identified patent and that said Letters Patent are hereby corrected as shown below:

Column 5, line 1, "inchs" should be -- inches -- ;
line 12 in right hand column of table, first item
should read -- .008 -- rather than ".005"; fourth
item should read -- .020 -- rather than ".028";
sixth item should read -- .025 -- rather than ".020".

SIGNED AND
SEALED
MAR 24 1970

(SEAL)
Attest:

Edward M. Fletcher, Jr.
Attesting Officer

WILLIAM E. SCHUYLER, JR.
Commissioner of Patents